(12) United States Patent
Pietraszkiewicz et al.

(10) Patent No.: US 8,439,629 B2
(45) Date of Patent: May 14, 2013

(54) BLADE OUTER AIR SEAL

(75) Inventors: Edward F. Pietraszkiewicz, Southington, CT (US); John C. Calderbank, Glastonbury, CT (US); Joseph A. Peto, Newmarket, NH (US); Lisa P. O'Neill, Manchester, CT (US); Michael J. Bruskotter, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 1401 days.

(21) Appl. No.: 11/712,812

(22) Filed: Mar. 1, 2007

(65) Prior Publication Data

US 2009/0067994 A1 Mar. 12, 2009

(51) Int. Cl.
*F01D 1/04* (2006.01)
*F01D 9/06* (2006.01)
*F01D 25/14* (2006.01)

(52) U.S. Cl.
USPC .............. 415/116; 415/173.1; 415/213.1

(58) Field of Classification Search .............. 415/116, 415/173.1, 173.4, 174.4, 213.1
See application file for complete search history.

(56) References Cited

U.S. PATENT DOCUMENTS

| 3,603,599 | A | * | 9/1971 | Laird | 277/414 |
| 4,314,792 | A | * | 2/1982 | Chaplin | 415/116 |
| 4,487,016 | A | * | 12/1984 | Schwarz et al. | 60/204 |
| 4,553,901 | A | * | 11/1985 | Laurello | 415/138 |
| 4,642,024 | A | * | 2/1987 | Weidner | 415/116 |
| 4,688,988 | A | * | 8/1987 | Olsen | 415/116 |
| 5,048,288 | A | * | 9/1991 | Bessette et al. | 60/226.1 |
| 5,092,735 | A | * | 3/1992 | Katy et al. | 415/115 |
| 5,593,278 | A | * | 1/1997 | Jourdain et al. | 415/173.2 |
| 5,609,469 | A | | 3/1997 | Worley et al. | |
| 5,649,806 | A | * | 7/1997 | Scricca et al. | 415/115 |
| 5,964,575 | A | * | 10/1999 | Marey | 415/115 |
| 6,139,257 | A | * | 10/2000 | Proctor et al. | 415/115 |
| 6,393,331 | B1 | * | 5/2002 | Chetta et al. | 700/97 |
| 6,647,624 | B2 | * | 11/2003 | Fried et al. | 29/889.2 |
| 6,997,673 | B2 | * | 2/2006 | Morris et al. | 415/1 |
| 7,033,138 | B2 | * | 4/2006 | Tomita et al. | 415/139 |

* cited by examiner

*Primary Examiner* — Richard Edgar
*Assistant Examiner* — Sean J Younger
(74) *Attorney, Agent, or Firm* — Bachman & LaPointe, P.C.

(57) ABSTRACT

A turbine engine blade outer air seal segment has a body having a base portion. The base portion has a transversely concave ID face, an aft end, a forward end, and first and second circumferential edges. The body has at least one mounting hook. At least one cover plate is secured to the body to define at least one cavity. The cover plate has a plurality of feed holes. A plurality of outlet holes extend through the base portion to the ID face. At least one of the base portion and cover plate comprises a protruding portion protruding into the cavity to form a partial restriction separating forward and aft cavity portions.

20 Claims, 4 Drawing Sheets

BLADE OUTER AIR SEAL

BACKGROUND

The disclosure relates to gas turbine engines. More particularly, the disclosure relates to casting of cooled shrouds or blade outer air seals (BOAS).

BOAS segments may be internally cooled by bleed air. For example, cooling air may be fed into a plenum at the outboard or outside diameter (OD) side of the BOAS. The cooling air may pass through passageways in the seal body and exit outlet ports in the inboard or inner diameter (ID) side of the body (e.g. to film cool the ID face). Air may also exit along the circumferential ends (matefaces) of the BOAS so as to be vented into the adjacent inter-segment region (e.g., to help cool feather seal segments sealing the adjacent BOAS segments).

An exemplary BOAS configuration includes a casting and an OD cover plate welded to the casting. Air passes from the plenum through holes in the cover plate and into one or more feed chambers/cavities in the BOAS from which the passageways extend. An exemplary BOAS is found in U.S. Pat. No. 6,393,331.

SUMMARY

One aspect of the disclosure involves a turbine engine blade outer air seal segment having a body having a base portion. The base portion has a transversely concave ID face, a forward end, an aft end, and first and second circumferential edges. The body has at least one mounting hook. At least one cover plate is secured to the body to define at least one cavity. The cover plate has a plurality of feed holes. A plurality of outlet holes extend through the base portion to the ID face. At least one of the base portion and cover plate comprises a protruding portion protruding into the cavity to form a partial restriction separating forward and aft cavity portions.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
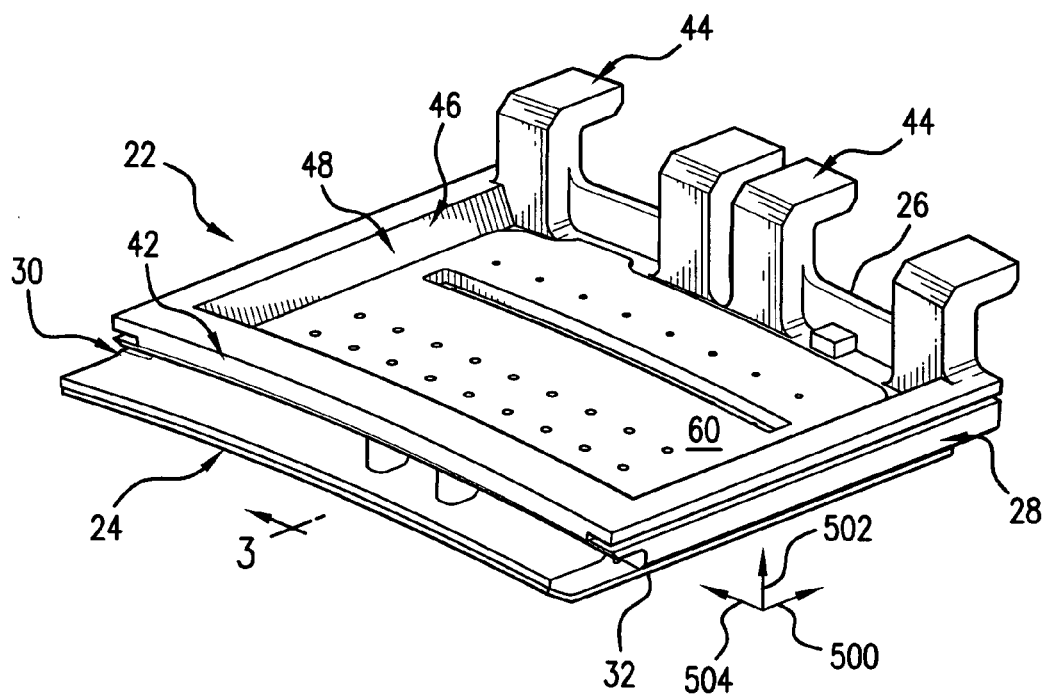
FIG. 1 is an isometric view of a blade outer airseal (BOAS).
Figure 2:
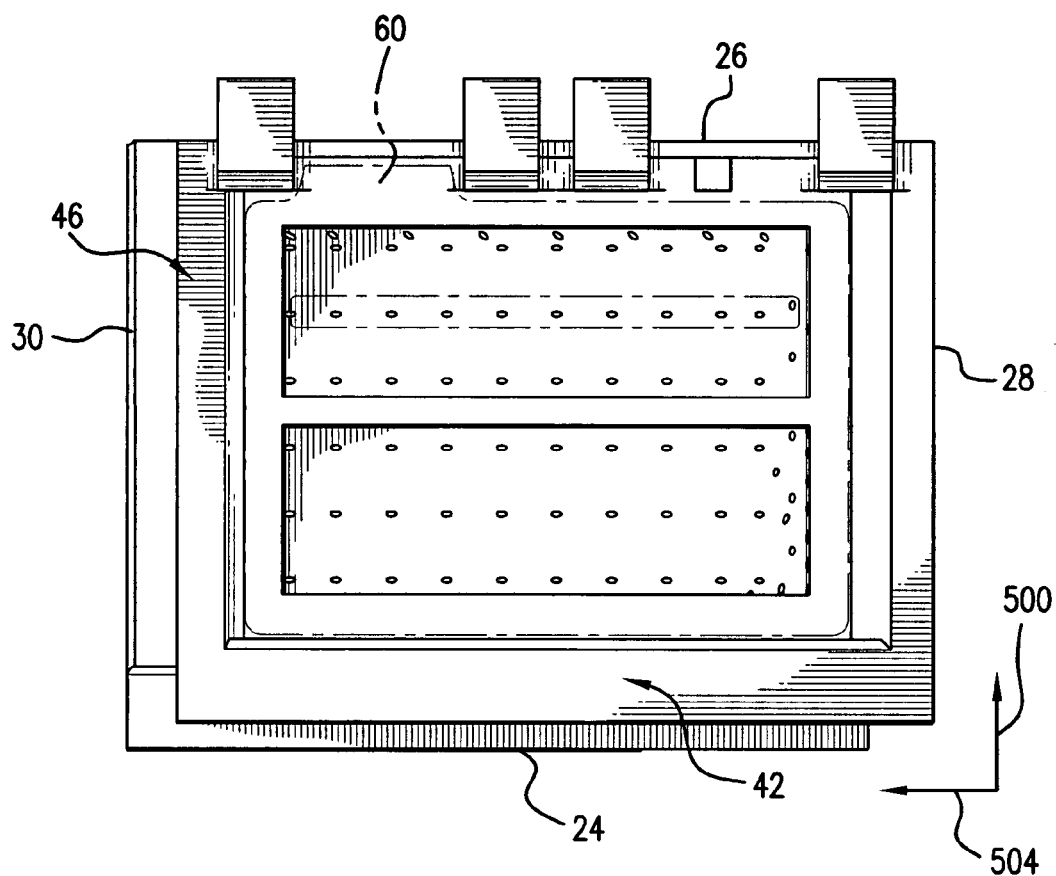
FIG. 2 is an OD/top view of the BOAS of FIG. 1 with baffle removed.

FIG. 1 shows blade outer air seal (BOAS) 20. The BOAS has a main body portion 22 having a leading/upstream/forward end 24 and a trailing/downstream/aft end 26. FIG. 1 further shows an approximate longitudinal/overall-downstream/aftward direction 500, an approximate radial outward direction 502, and an approximate circumferential direction 504. The body has first and second circumferential ends or matefaces 28 and 30. The body has an inner diameter (ID)/inboard face 32 and an outer diameter (OD)/outboard face 34.

To mount the BOAS to environmental structure 40 (FIG. 3), the exemplary BOAS has a plurality of mounting hooks. The exemplary BOAS has a single forward mounting hook 42 having a forwardly-projecting distal portion recessed aft of the forward end 24. The exemplary BOAS has a series of four aft hooks 44 each having a rearwardly-projecting distal portion protruding beyond the aft end 26.

Figure 3:
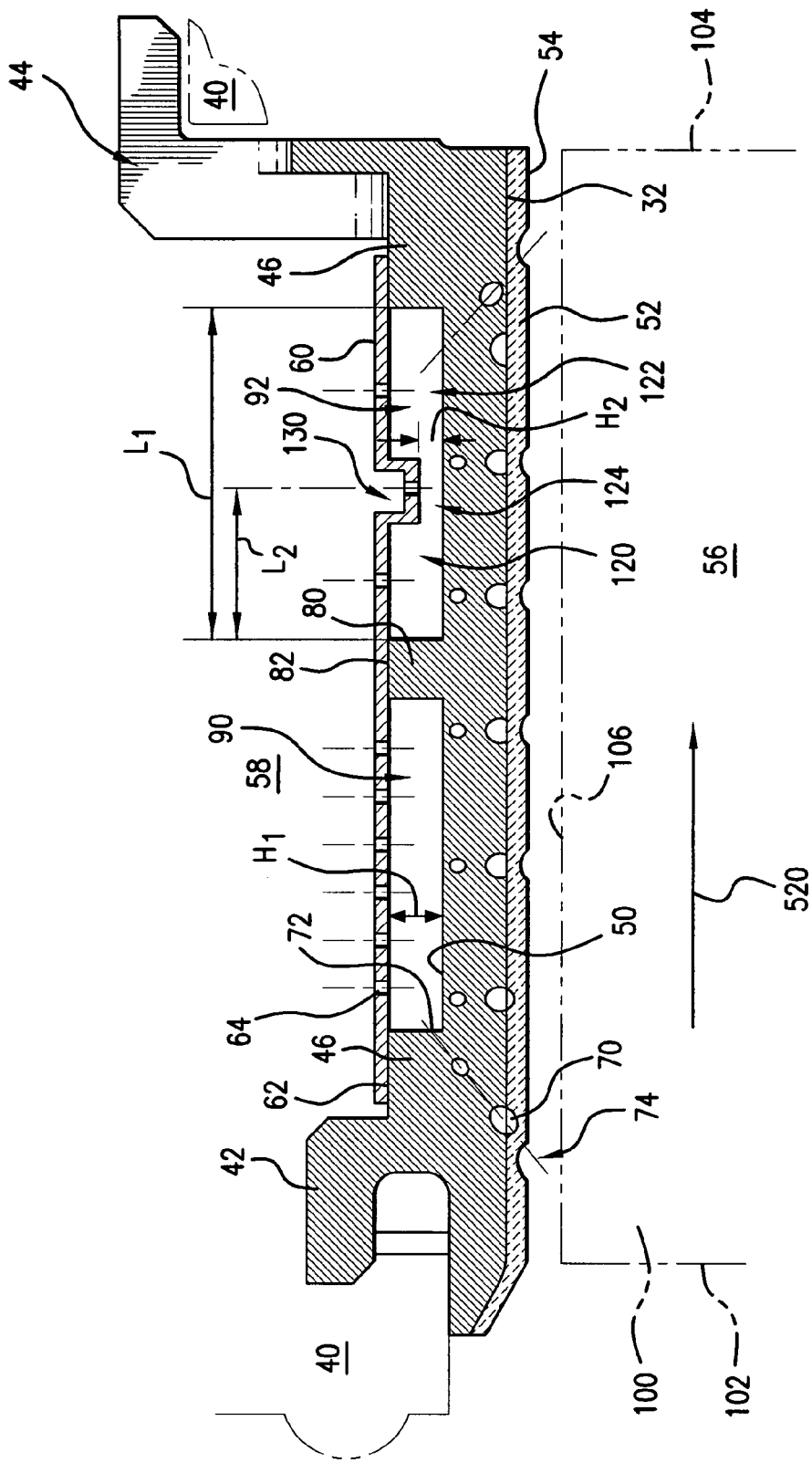
FIG. 3 is a longitudinal sectional view of the BOAS of FIG. 1 taken along line 3-3.

The BOAS has a wall structure 46 circumscribing/surrounding a recess/cavity 48 described in further detail below. The exemplary distal portion of the forward hook 42 is formed as a full width lip extending from a front segment of the wall 46 (FIG. 3). The exemplary proximal portions of the aft hooks 44 extend upward from an aft segment of the wall 46. A floor or base 50 of the chamber is locally formed by a central portion of the OD face 34. The ID face may bear a thermal barrier coating 52 having an exposed surface 54.

A circumferential ring array of a plurality of the BOAS 20 may encircle an associated blade stage of a gas turbine engine. The assembled ID faces 32/coating surfaces 54 thus locally bound an outboard extreme of the core flowpath 56 (FIG. 3). The BOAS 20 may have features for interlocking the array. The exemplary matefaces 28 and 30 have complementary shiplap features. Other implementations may include slots (not shown) for accommodating edges of seals spanning junctions between adjacent BOAS 20 or may include finger joints.

The BOAS may be air-cooled. For example, bleed air may be directed to a chamber 58 (FIG. 3) immediately outboard of a baffle plate 60 that extends across the chamber 48. A perimeter portion of the underside of the baffle plate 60 may sit atop and be welded or brazed to a shoulder surface 62 of the wall 46. The bleed air may be directed through impingement feed holes 64 in the plate 60 to the inboard portion of the chamber 48. Air may exit the chamber 48 through discharge passageways 70. Exemplary passageways 70 extend from inlets 72 at the chamber 48 to outlets 74 along the TBC 52.

The exemplary casting includes a circumferential rib 80 in the chamber 48. The exemplary rib is full shoulder height so that its outboard surface 82 may contact the underside/ID surface of the plate (e.g., and be secured thereto as the plate is secured to the shoulder surface 62). The rib divides the portion of the chamber 48 below the plate 60 into a fore (sub)chamber/cavity 90 and an aft (sub)chamber/cavity 92. As so far described, the casting with full height rib 80 may represent a baseline prior art casting.

FIG. 3 schematically shows a blade 100 of the associated stage. The blade has an airfoil with a leading edge 102, a trailing edge 104, and a tip 106. Action of the airfoil imposes a pressure gradient to the airflow 520 passing downstream along the surface 54. For example, the gradient may provide an exemplary 50% drop in pressure from a leading group of the outlets 74 to a trailing group of the outlets 74. This pressure difference may pose difficulties in cooling the BOAS. In particular, feeding from a common chamber 48 may end up providing one or both of excessive flow through the trailing holes and insufficient flow through the leading holes. To address this, the prior art has tailored the distribution of feed air to the two fully isolated chambers 90 and 92. Nevertheless, there remain such flow problems within either of the two chambers.

To address this problem, the chamber 92 is divided into separate upstream and downstream regions 120 and 122 respectively. The division is only partial, with an open gap or restricted region 124 separating the regions 120 and 122 from each other. The exemplary restriction is formed by a channel 130 in the baffle plate 60 projecting as a blister toward the floor 50. The exemplary channel is essentially full width of the chamber 48 and provides the restricted region 124 with a height $H_2$ approximately 30-60% of a height $H_1$ of remaining majority portions of the chamber 92. Exemplary heights are essentially uniform, but may also represent other characteristic heights (e.g., mean, modal, or median).

The exemplary chamber 92 has a length $L_1$. The center of the exemplary channel 130 is at a length $L_2$ downstream of the downstream face of the wall/rib 80. Exemplary $L_2$ is 40-60% of $L_1$. In an exemplary model of a steady state operating condition, an exemplary pressure in the flowpath 56 at the leading group of outlets 74 is an exemplary 300-400 psia whereas the pressure at a trailing/downstream group is about 50-75% of that. Four upstream-to-downstream groups of holes 70 are fed from the cavity 90. An exemplary pressure at the outlets 74 of the downstreammost of these four is proportionately less than at the leading group. The size/number/distribution of holes along the cavity 90 may be selected to provide a pressure in the cavity 90 above that of the leading group of holes (e.g., 5-15% above or about 20-40 psi above).

Four upstream-to-downstream groups of holes 70 are fed from the cavity 92. An exemplary pressure at the outlets 74 of the upstreammost of these four is proportionately above that of the trailing group. The height $H_2$ is selected to be sufficiently small to permit an effective pressure difference between the regions 120 and 122. The pressure difference allows each of the regions 120 and 122 to be maintained at an associated pressure above (e.g., 5-15% above) that of their highest pressure outlets 74. The position of the channel may be selected to apportion the holes 70 between the regions 120 and 122 in such a way as to minimize total air requirements for a given cooling level.

A zero value of $H_2$ might interfere with local cooling and might permit rubbing between the plate and body. Thus a higher value may be preferred. Plate hole diameter for holes 64 (if any) and the quantity/distribution of such holes may be chosen in combination with $H_2$ to provide desired local impingement cooling. The quantities of the holes 64 along each region 120 and 122 may be chosen to maintain the desired pressures in those regions.

Figure 4:
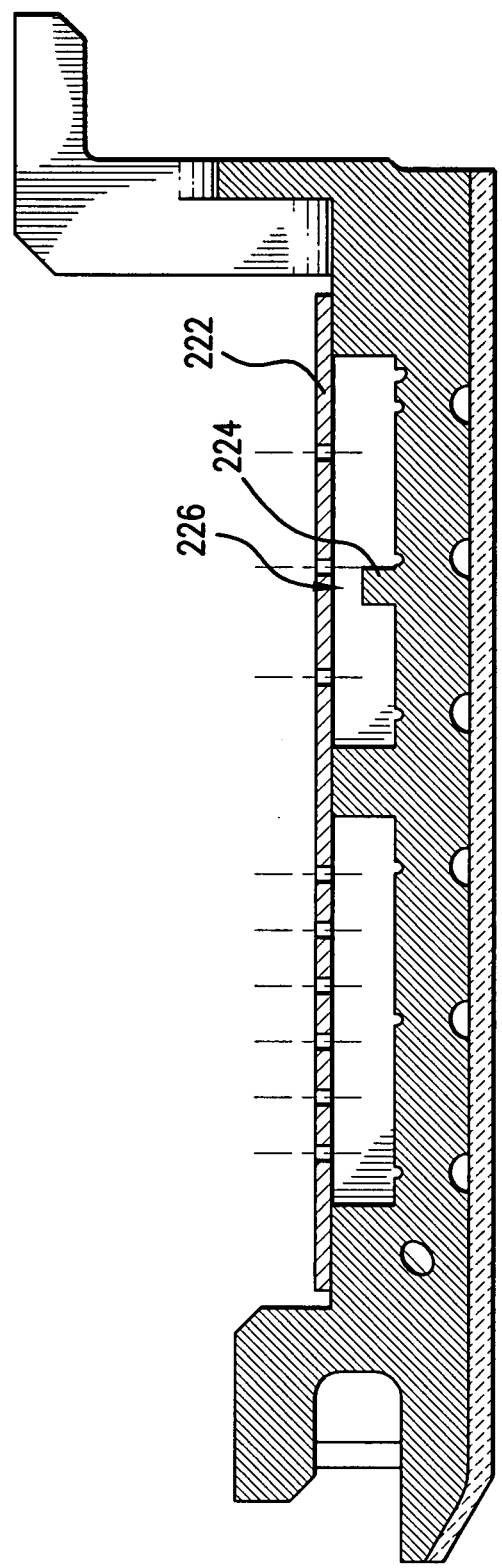
FIG. 4 is a longitudinal sectional view of an alternate BOAS.

FIG. 4 shows an alternative BOAS 220 otherwise similar but wherein the baffle plate 222 is unchanneled and a partial height rib 224 extends radially outward from the floor 50 to provide a restricted region 226. The rib may be sized and positioned according to similar considerations as those used to size and position the channel.

The BOAS may be formed as a reengineering of a baseline BOAS configuration. In one reengineering example, the shape of the casting is preserved while the channel 130 is added to an otherwise flat baffle plate. Such a solution may, for example, have an advantage in that the wax pattern molded for the casting need not be altered. Stamping the channel into the sheetmetal baffle plate may be a much easier and less expensive solution.

The reengineering may also shift the distribution of the holes 64. The hole size (e.g., diameter for typical circular holes) may be reduced for any holes along the channel to maintain a chamber height to diameter ratio effective for impingement cooling of the chamber floor. Total hole area may be reduced to reduce total air consumption. For example, hole count may be reduced along the aft camber 92 and, more particularly, its aft region 122. More complex reengineerings might involve the holes 70.

One or more embodiments have been described. Nevertheless, it will be understood that various modifications may be made without departing from the spirit and scope of the invention. For example, when implemented in the reengineering of a baseline BOAS, or using existing manufacturing techniques and equipment, details of the baseline BOAS or existing techniques or equipment may influence details of any particular implementation. Accordingly, other embodiments are within the scope of the following claims.

What is claimed is:

1. A turbine engine blade outer air seal segment comprising:
   a body having:
      a base portion having:
         a transversely concave ID face;
         a forward end;
         an aft end; and
         first and second circumferential edges; and
      at least one mounting hook; and
   at least one cover plate secured to the body to define at least one cavity and having a plurality of feed holes, a plurality of outlet holes extending through the base portion to the ID face,
   wherein:
   at least one of the base portion and cover plate comprises a protruding portion protruding into the cavity to form a partial restriction separating forward and aft portions, the feed holes being along at least one of the forward and aft portions, the protruding portion forms said partial restriction to a characteristic gap height ($H_2$) less than a second characteristic height ($H_1$), said second characteristic height being of a majority portion of the cavity.

2. The segment of claim 1 wherein:
   a cross-sectional dimension of a group of the feed holes associated with the protruding portion is smaller than a corresponding dimension of a group of the feed holes away from the protruding portion.

3. The segment of claim 1 wherein:
   said characteristic gap height ($H_2$) is 30-60% of said second characteristic height ($H_1$).

4. The segment of claim 1 further comprising:
   a coating on the base portion ID face.

5. The segment of claim 1 wherein:
   the at least one mounting hook includes:
   at least one front mounting hook; and
   at least one aft mounting hook.

6. The segment of claim 1 wherein:
   the protruding portion comprises a blister on the cover plate.

7. The segment of claim 1 wherein:
   the cover plate is a stamping;
   the body is a casting having a thermal barrier coating on the ID face; and
   the cover plate is welded to the body.

8. A method for engineering the segment of claim 1 comprising:
   determining an indication of an operational core flow pressure drop along the ID face; and
   selecting a characteristic of the protruding portion to provide a fore-aft pressure drop within the cavity.

9. The method of claim 8 wherein:
   the selecting comprises selecting said characteristic gap height ($H_2$) and a longitudinal position of the protrusion.

10. The method of claim 8 wherein:
    the selecting comprises selecting a cross-sectional dimension of a group of the feed holes associated with the protruding portion to be smaller than a corresponding dimension of a group of the feed holes away from the protruding portion.

11. A turbine engine blade outer air seal segment comprising:
    a body having:
       a base portion having:
          a transversely concave ID face;

a forward end;
an aft end; and
first and second circumferential edges; and
at least one mounting hook; and
at least one cover plate secured to the body to define at least one cavity and having a plurality of feed holes, a plurality of outlet holes extending through the base portion to the ID face,
wherein:
at least one of the base portion and cover plate comprises means for providing an operational pressure gradient within the cavity to compensate for an operational core flow pressure drop along the ID face.

12. The segment of claim 11 wherein:
the means comprises a constriction of the cavity effective to maintain regions respectively upstream and downstream of the constriction at an associated pressure 5-15% above that of their highest pressure said outlet holes when a pressure at a trailing/downstream group of said outlet holes is 50-75% of a pressure at a leading group of said outlet holes.

13. A method for reengineering a configuration of a turbine engine blade outer air seal segment from a baseline configuration to a reengineered configuration, the baseline configuration comprising:
a body having:
a base portion having:
a transversely concave ID face;
a forward end;
an aft end; and
first and second circumferential edges; and
at least one mounting hook; and
at least one cover plate secured to the body to define at least one impingement cavity and having a plurality of feed holes, a plurality of outlet holes extending through the base portion to the ID face,
the method comprising:
adding a protrusion into the cavity from at least one of the cover plate and base portion wherein said protrusion forms a partial restriction to a first height less than a second height, said second height being along a majority portion of the cavity.

14. The method of claim 13 further comprising:
determining an indication of an operational core flow pressure drop along the ID face; and
selecting a characteristic of the protrusion to provide a fore-aft pressure drop within the cavity.

15. The method of claim 13 wherein:
the protrusion comprises a blister.

16. The method of claim 13 wherein:
relative to the baseline configuration, the reengineered configuration maintains the base portion unchanged, including size and distribution of the outlet holes.

17. The method of claim 13 wherein:
relative to the baseline configuration, the reengineered configuration maintains the base portion unchanged, except for size and distribution of the outlet holes.

18. The method of claim 13 wherein:
relative to the baseline configuration, the reengineered configuration reduces a total cross-sectional area of the feed holes.

19. The method of claim 18 wherein:
relative to the baseline configuration, the reengineered configuration reduces individual cross-sectional area of some of the feed holes.

20. The method of claim 13 wherein:
relative to the baseline configuration, the reengineered configuration reduces individual cross-sectional area of some of the feed holes.

* * * * *